US008844281B2

(12) United States Patent
Browne et al.

(10) Patent No.: US 8,844,281 B2
(45) Date of Patent: Sep. 30, 2014

(54) SHAPE MEMORY ALLOY HEAT ENGINES AND ENERGY HARVESTING SYSTEMS

(75) Inventors: Alan L. Browne, Grosse Pointe, MI (US); Nancy L. Johnson, Northville, MI (US); John Andrew Shaw, Dexter, MI (US); Christopher Burton Churchill, Ann Arbor, MI (US); Andrew C. Keefe, Encino, CA (US); Geoffrey P. McKnight, Los Angeles, CA (US); Paul W. Alexander, Ypsilanti, MI (US); Guillermo A. Herrera, Winnetka, CA (US); James Ryan Yates, Mission Viejo, CA (US); Jeffrey W. Brown, Los Gatos, CA (US)

(73) Assignees: GM Global Technology Operations LLC, Detroit, MI (US); Dynalloy, Inc, Tustin, CA (US); The Regents of the University of Michigan, Ann Arbor, MI (US)

( * ) Notice: Subject to any disclaimer, the term of this patent is extended or adjusted under 35 U.S.C. 154(b) by 172 days.

(21) Appl. No.: 13/340,964

(22) Filed: Dec. 30, 2011

(65) Prior Publication Data

US 2012/0216527 A1  Aug. 30, 2012

Related U.S. Application Data

(60) Provisional application No. 61/447,317, filed on Feb. 28, 2011, provisional application No. 61/447,315, filed on Feb. 28, 2011, provisional application No. 61/447,328, filed on Feb. 28, 2011, provisional application No. 61/447,321, filed on Feb. 28, 2011, provisional application No. 61/447,324, filed on Feb. 28, 2011, provisional application No. 61/447,306, filed on Feb. 28, 2011.

(51) Int. Cl.
| | |
|---|---|
| F01B 29/10 | (2006.01) |
| F02G 1/04 | (2006.01) |
| C22F 1/00 | (2006.01) |
| C22C 14/00 | (2006.01) |
| C22C 16/00 | (2006.01) |
| C22C 27/00 | (2006.01) |
| F16G 1/00 | (2006.01) |
| F16G 5/00 | (2006.01) |
| F16G 9/00 | (2006.01) |
| F16G 1/18 | (2006.01) |
| F16G 1/20 | (2006.01) |
| F03G 7/06 | (2006.01) |

(52) U.S. Cl.
CPC ...... *F03G 7/06* (2013.01); *F03G 7/065* (2013.01); *Y10S 420/902* (2013.01)
USPC .......... 60/528; 60/527; 60/529; 148/402; 148/421; 148/563; 420/902; 474/237; 474/239; 474/272

(58) Field of Classification Search
USPC .......... 60/527–529; 148/402, 421, 563; 420/902; 474/237, 239, 272
See application file for complete search history.

(56) References Cited

U.S. PATENT DOCUMENTS

| | | | | |
|---|---|---|---|---|
| 3,303,642 | A * | 2/1967 | Lee, II | 60/530 |
| 5,186,420 | A * | 2/1993 | Beauchamp et al. | 244/219 |
| 5,842,312 | A * | 12/1998 | Krumme et al. | 52/167.1 |
| 6,024,347 | A * | 2/2000 | Grosskrueger et al. | 267/220 |
| 7,527,425 | B2 * | 5/2009 | Born | 368/131 |
| 2006/0148296 | A1 * | 7/2006 | Zanella et al. | 439/310 |
| 2008/0034750 | A1 * | 2/2008 | Gao et al. | 60/527 |
| 2012/0183718 | A1 * | 7/2012 | Fabre et al. | 428/67 |

FOREIGN PATENT DOCUMENTS

GB        2321280 A  *  7/1998  ........... F03G 7/06

* cited by examiner

*Primary Examiner* — Thomas E. Denion
*Assistant Examiner* — Daniel Wagnitz
(74) *Attorney, Agent, or Firm* — Quinn Law Group, PLLC

(57) ABSTRACT

A heat engine includes a first rotatable pulley and a second rotatable pulley spaced from the first rotatable pulley. A shape memory alloy (SMA) element is disposed about respective portions of the pulleys at an SMA pulley ratio. The SMA element includes a first wire, a second wire, and a matrix joining the first wire and the second wire. The first wire and the second wire are in contact with the pulleys, but the matrix is not in contact with the pulleys. A timing cable is disposed about respective portions of the pulleys at a timing pulley ratio, which is different than the SMA pulley ratio. The SMA element converts a thermal energy gradient between the hot region and the cold region into mechanical energy.

7 Claims, 10 Drawing Sheets

US 8,844,281 B2

SHAPE MEMORY ALLOY HEAT ENGINES AND ENERGY HARVESTING SYSTEMS

CROSS-REFERENCE TO RELATED APPLICATIONS

This application claims the benefit of U.S. Provisional Application No. 61/447,317; U.S. Provisional Application No. 61/447,315; U.S. Provisional Application No. 61/447,328; U.S. Provisional Application No. 61/447,321; U.S. Provisional Application No. 61/447,306; and U.S. Provisional Application No. 61/447,324; all filed Feb. 28, 2011. All of which are hereby incorporated by reference in their entirety.

STATEMENT REGARDING FEDERALLY SPONSORED RESEARCH OR DEVELOPMENT

This invention was made with U.S. Government support under ARPA-E Contract number DE-AR0000040, awarded by the Department of Energy. The U.S. Government may have certain rights in this invention.

TECHNICAL FIELD

The present invention generally relates to energy harvesting systems, and more specifically, to energy harvesting systems using shape-memory alloy heat engines.

BACKGROUND OF THE INVENTION

Thermal energy may be produced by industrial, assembly, and manufacturing processes. Automobiles, small equipment, and heavy equipment also produce thermal energy. Some of this thermal energy is waste heat, which is heat for which no useful application is found or planned, and is generally a waste by-product. Waste heat may be expelled to the atmosphere. The burning of transport fuels also contributes to waste heat.

SUMMARY OF THE INVENTION

A heat engine is provided. The heat engine includes a first rotatable pulley and a second rotatable pulley spaced from the first rotatable pulley. A shape memory alloy (SMA) element is disposed about a portion of the first rotatable pulley at a first radial distance and about a portion of the second rotatable pulley at a second radial distance. The first and second radial distances define an SMA pulley ratio.

The SMA element includes a first wire, a second wire parallel to the first wire, and a matrix joining the first wire and the second wire. The first wire and the second wire are in contact with the first rotatable pulley and the second rotatable pulley, but the matrix is not in contact with the first rotatable pulley and the second rotatable pulley.

A timing cable disposed about a portion the first rotatable pulley at a third radial distance and about a portion of the second rotatable pulley at a fourth radial distance. The third and fourth radial distances defining a timing pulley ratio, which is different than the SMA pulley ratio.

The SMA element is configured to be placed in thermal communication with a hot region at a first temperature and with a cold region at a second temperature lower than the first temperature. The SMA element selectively changes crystallographic phase between martensite and austenite and thereby either contracts and expands in response to exposure to the first temperature and the second temperature. The SMA element thereby converts a thermal energy gradient between the hot region and the cold region into mechanical energy.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
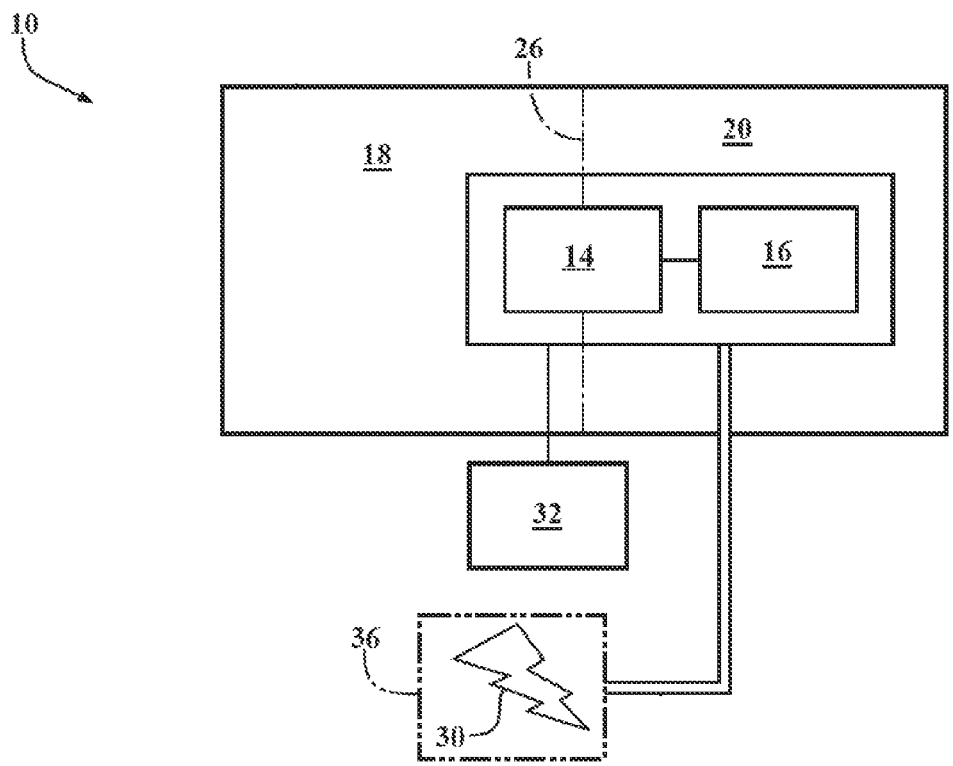
FIG. 1 is a schematic diagram of an energy harvesting system including a heat engine.

Referring to the drawings, wherein like reference numbers correspond to like or similar components whenever possible throughout the several figures, there is shown in FIG. 1 a heat recovery system or energy harvesting system 10. Features and components shown and described in other figures may be incorporated and used with those shown in FIG. 1. The energy harvesting system 10 shown includes a heat engine 14 and a driven component 16.

The energy harvesting system 10 utilizes a first fluid region or a hot region 18, having a first temperature. The hot region 18 may be in heat transfer communication with a heat source, such as waste heat, or may represent any region of relatively warm temperature to contribute to operation of the heat engine 14, as described herein. The energy harvesting system 10 also utilizes a second fluid region or a cold region 20, having a second temperature, which is generally lower than the first temperature of the hot region 18. The cold region 20 may be in heat transfer communication with a cooling source, such as such a cold fluid, or may represent any region of relatively cool temperature to contribute to operation of the heat engine 14, as described herein. The designation of the hot region 18 and the cold region 20, or the temperatures associated therewith as either "first" or "second" is arbitrary and is not limiting.

The heat engine 14, as described herein, is configured to convert thermal energy from the temperature differential between the hot region 18 and the cold region 20 into mechanical energy. The driven component 16 of the energy harvesting system 10 may be configured to be driven by the mechanical energy or power generated from the conversion of thermal energy to mechanical energy within the heat engine 14.

The driven component 16 may be a mechanical device, such as, without limitation: a generator, a fan, a clutch, a blower, a pump, a compressor, and combinations thereof. It should be appreciated that the driven component 16 is not limited to these devices, as any other device known to those skilled in the art may also be used. The driven component 16 may be operatively connected to the heat engine 14 such that the driven component 16 is driven by the heat engine 14.

More specifically, the driven component 16 may be part of an existing system, such as a heating or cooling system and the like. Driving the driven component 16 with mechanical energy provided by the heat engine 14 may also allow an associated existing system within the energy harvesting system 10 to be decreased in size and/or capacity or eliminated entirely.

Additionally, the mechanical energy produced by the energy harvesting system 10 may be stored for later use or as an auxiliary energy supply. In vehicles or power production facilities, the energy harvesting system 10 increases the overall efficiency of the vehicle or production facility by converting what may have been waste thermal energy into energy for current or later use.

The driven component 16 may be a generator or an electric machine (which may be referred to as a motor/generator) configured to convert the mechanical energy from the heat engine 14 into electricity 30 (as schematically shown in FIG. 1). Alternatively, the driven component 16 may be attached to, or in communication with, a generator. The driven component 16 may be any suitable device configured to convert mechanical energy to electricity 30. For example, the driven component 16 may be an electric machine that converts mechanical energy to electricity 30 using electromagnetic induction. The driven component 16 may include a rotor (not shown) that rotates with respect to a stator (not shown) to generate electricity 30. The electricity 30 generated by the driven component 16 may then be used to assist in powering one or more electric systems or may be stored in an energy storage device.

The hot region 18 and the cold region 20 may be sufficiently spaced from one another to maintain the temperature differential between the two, or may be separated by a sufficient heat exchange barrier 26, including, without limitation: a heat shield, a Peltier device, or an insulating barrier. The heat exchange barrier 26 may be employed to separate the heat engine 14 into the hot region 18 and the cold region 20 such that a desired temperature differential between the hot region 18 and the cold region 20 is achieved. When the heat exchange barrier 26 disposed between the hot region 18 and the cold region 20 is a Peltier device, such as a thermoelectric heat pump, the heat exchange barrier 26 is configured to generate heat on one side of the barrier 26 and to cool on an opposing side of the barrier 26.

The hot region 18 and the cold region 20 of the energy harvesting system 10 may be filled with, for example and without limitation: gas, liquid, or combinations thereof. Alternatively, the hot region 18 and the cold region 20 may represent contact zones or contact elements configured for conductive heat transfer with the heat engine 14.

The heat engine 14 is configured to utilize temperature differentials between the hot region 18 and the cold region 20 in the energy harvesting system 10 in areas such as, without limitation: vehicular heat and waste heat, power generation heat and waste heat, industrial waste heat, geothermal heating and cooling sources, solar heat and waste heat, and combinations thereof. It should be appreciated that the energy harvesting system 10 may be configured to utilize temperature differentials in numerous other areas and industries.

Figure 2:
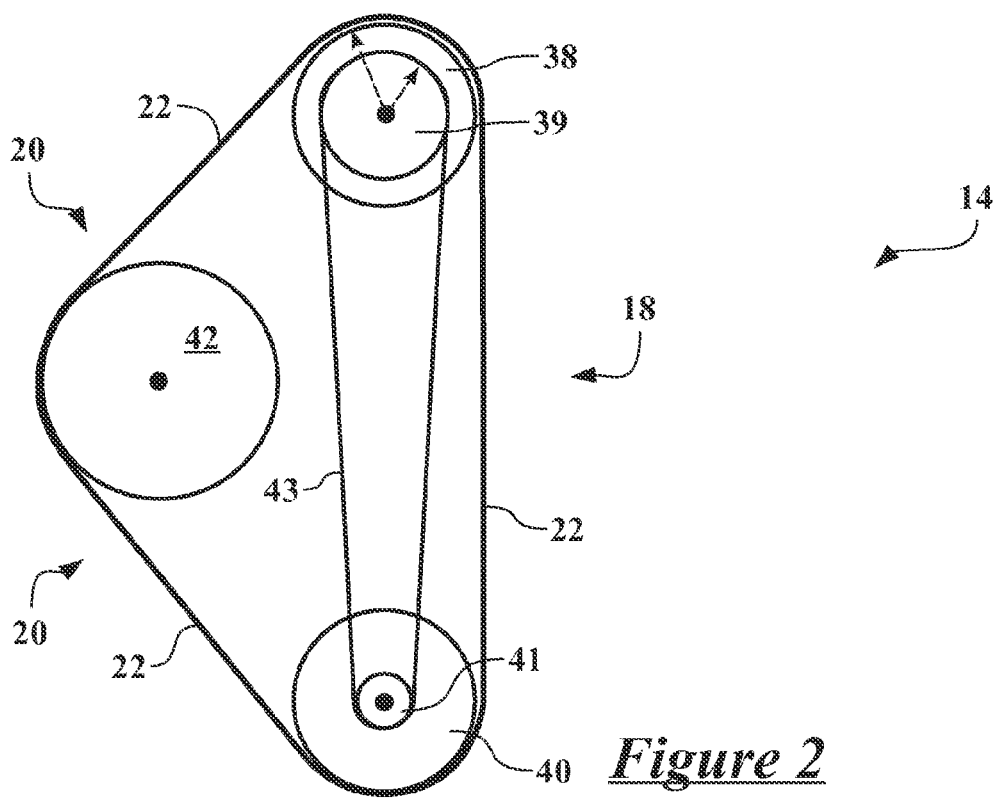
FIG. 2 is a schematic side view of the heat engine of FIG. 1.
Figure 3:
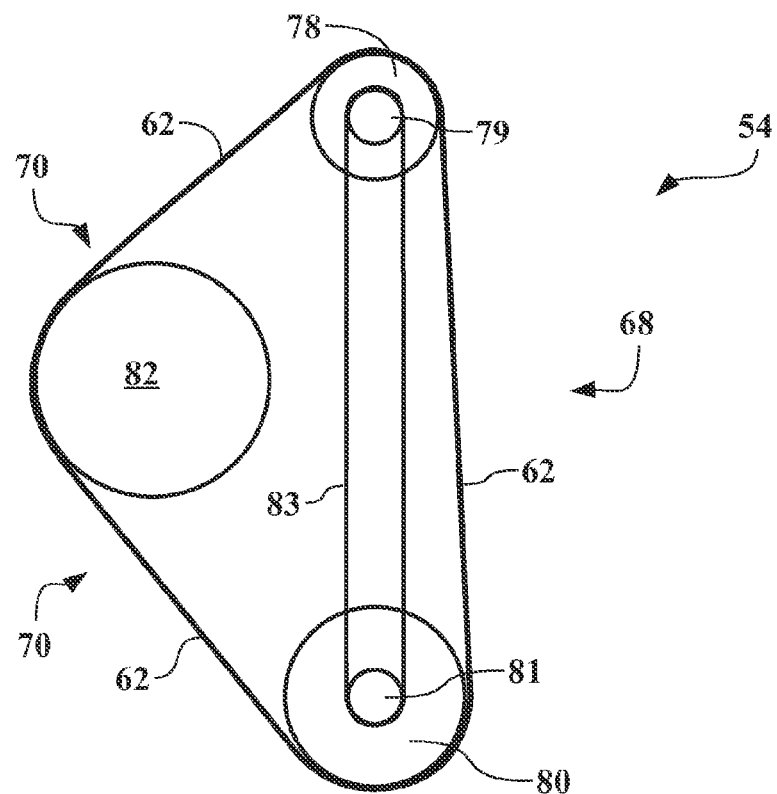
FIG. 3 is a schematic side view of another heat engine usable with the energy harvesting system of FIG. 1.

Referring now to FIG. 2, and with continued reference to FIG. 1, there is shown a more-detailed schematic view of the heat engine 14 shown in FIG. 1. Other types and configurations of heat engines may be used with the energy harvesting system 10 shown in FIG. 1. FIG. 3 shows another heat engine 54 which may also be used with the energy harvesting system 10 shown in FIG. 1, and includes many similar components and functions similarly to the heat engine 14.

The heat engine 14 of FIG. 2 includes a shape memory alloy (SMA) member 22 and is operatively disposed in, or in heat-exchange communication with, the hot region 18 and the cold region 20. In the configuration shown, the hot region 18 may be adjacent to a heat exhaust pipe and the cold region 20 may be placed in ambient air or in the path of moving, relatively cool, air from fans or blowers.

The heat engine 14 also includes a first member or first pulley 38 and a second member or second pulley 40. The first pulley 38 and the second pulley 40 may also be referred to as drive pulleys. The heat engine 14 also includes an idler pulley 42, located so as to add travel to the path of the SMA member 22 and which may be configured to variably add tension (or take up slack) to the SMA member 22. In some configurations of the heat engine 14, the idler pulley 42 may not be included.

The SMA member 22 forms a loop around the first pulley 38, the second pulley 40, and the idler pulley 42. As used herein, one loop refers to circumscribing the whole rotational path of the SMA member 22 around the heat engine 14.

In this configuration, the first pulley 38 and the second pulley 40 are disposed between the hot region 18 and the cold region 20. However, the heat engine may be configured with the first pulley operatively disposed in the hot region 18 and the second pulley 40 operatively disposed in the cold region 20, or the reverse. The idler pulley 42 may likewise be disposed in either the hot region 18 or the cold region 20.

The heat engine 14 further includes two timing members, a first timing pulley 39 and a second timing pulley 41, which are fixed to the first pulley 38 and the second pulley 40, respectively. The first timing pulley 39 and the second timing pulley 41 provide a mechanical coupling between the first pulley 38 and the second pulley 40 (the two drive pulleys) such that rotation of either drive pulley ensures the rotation of the other in the same direction.

The first timing pulley 39 and the second timing pulley 41 are linked by a timing chain or timing belt 43. Alternatively, a timing mechanism such as sprockets linked with a chain or meshed gears may also be used to provide a mechanical coupling between the first pulley 38 and the second pulley 40. Inclusion of the mechanical coupling provided by the timing chain 43 (in addition to the SMA member 22) between the first pulley 38 and the second pulley 40, means that the heat engine 14 may be referred to as a synchronized heat engine.

The SMA member 22 is disposed about a portion of the first pulley 38 at a first radial distance and about a portion of the second pulley 40 at a second radial distance, the first and second radial distances defining an SMA pulley ratio. The timing belt 43 is disposed about the first timing pulley 39 at a third radial distance and about a portion of second timing pulley 41 at a fourth radial distance, the third and fourth radial distances defining a timing pulley ratio. The SMA pulley ratio is different from the timing pulley ratio. Radial distances are schematically illustrated by phantom arrows extending from the axis of the first pulley 38 and the first timing pulley 39.

In the embodiment shown in FIG. 2, the first timing pulley 39 is larger in diameter than the second timing pulley 41. The difference in diameter alters the reactive torque or moment arm provided by the respectively pulley members. Different moments arms about the pulleys cause a resultant torque to be generated from the contraction forces, as explained herein, along the SMA member 22 adjacent the hot region 18. Note that in the embodiment shown in FIG. 3, the timing pulleys are substantially the same size but the drive pulleys are different sizes.

The heat engine 14 is configured to convert thermal energy to mechanical energy and, with the help of the driven component 16, convert mechanical energy to electrical energy. More specifically, the energy harvesting system 10 utilizes a temperature differential between the hot region 18 and the cold region 20 to generate mechanical and/or electrical energy via the SMA member 22, as explained in more detail below. The mechanical and electrical energy created from available thermal energy may be used or stored, as opposed to allowing the thermal energy to dissipate.

The SMA member 22 is disposed in thermal contact, or heat-exchange communication, with each of the hot region 18 and the cold region 20. The SMA member 22 of the heat engine 14 has a crystallographic phase changeable between austenite and martensite in response to exposure to the first and second temperatures of the hot region 18 and the cold region 20.

As used herein, the terminology "SMA" (SMA) refers to alloys that exhibit a shape memory effect. That is, the SMA member 22 may undergo a solid state, crystallographic phase change via a shift between a martensite phase, i.e., "martensite", and an austenite phase, i.e., "austenite." Alternatively stated, the SMA member 22 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—i.e., Young's modulus is approximately 2.5 times lower—than the comparatively higher-temperature austenite phase.

The temperature at which the SMA member 22 begins to change from the austenite phase to the martensite phase is known as the martensite start temperature, $M_s$. The temperature at which the SMA member 22 completes the change from the austenite phase to the martensite phase is known as the martensite finish temperature, $M_f$. Similarly, as the SMA member 22 is heated, the temperature at which the SMA member 22 begins to change from the martensite phase to the austenite phase is known as the austenite start temperature, $A_s$. The temperature at which the SMA member 22 completes the change from the martensite phase to the austenite phase is known as the austenite finish temperature, $A_f$.

Therefore, the SMA member 22 may be characterized by a cold state, i.e., when a temperature of the SMA member 22 is below the martensite finish temperature $M_f$ of the SMA member 22. Likewise, the SMA member 22 may also be characterized by a hot state, i.e., when the temperature of the SMA member 22 is above the austenite finish temperature $A_f$ of the SMA member 22.

In operation, SMA member 22 that is pre-strained or subjected to tensile stress can change dimension upon changing crystallographic phase to thereby convert thermal energy to mechanical energy. That is, the SMA member 22 may change crystallographic phase from martensite to austenite and thereby dimensionally contract if pseudoplastically pre-strained so as to convert thermal energy to mechanical energy. Conversely, the SMA member 22 may change crystallographic phase from austenite to martensite and if under stress thereby dimensionally expand and be stretched.

The difference in stiffness, and thus in stress, in the austenite and martensite sections of the SMA member 22 coupled with the pulley ratio between the first timing pulley 39 and the second timing pulley 41 produces net torque from thermal energy. The net torque causes the SMA member 22 to rotate and create kinetic energy in the heat engine 14, which the driven member 16 may then convert into electrical energy or otherwise utilize.

Pseudoplastically pre-strained refers to stretching of the SMA member 22 while in the martensite phase so that the strain exhibited by the SMA member 22 under that loading condition is not fully recovered when unloaded, where purely elastic strain would be fully recovered. In the case of the SMA member 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the SMA member 22 transforms to its austenite phase, that strain can be recovered, returning the SMA member 22 to the original length observed prior to application of the load.

The SMA member 22 may be stretched before installation into the heat engine 14, such that a nominal length of the SMA member 22 includes recoverable pseudoplastic strain. Alternating between the pseudoplastic deformation state (relatively long length) and the fully-recovered austenite phase (relatively short length) provides the motion used for actuating or driving the heat engine 14. Without pre-stretching the SMA member 22, little deformation would be seen during phase transformation.

The SMA member 22 may change both modulus and dimension upon changing crystallographic phase to thereby convert thermal energy to mechanical energy. More specifically, the SMA member 22, if pseudoplastically pre-strained, may dimensionally contract upon changing crystallographic phase from martensite to austenite and may dimensionally expand, if under tensile stress, upon changing crystallographic phase from austenite to martensite to thereby convert thermal energy to mechanical energy. Therefore, when a temperature differential exists between the first temperature of the hot region 18 and the second temperature of the cold region 20, i.e., when the hot region 18 and the cold region 20 are not in thermal equilibrium, respective localized regions of the SMA member 22 disposed within the hot region 18 and the cold region 20 may respectively dimensionally expand and contract upon changing crystallographic phase between martensite and austenite.

The SMA member 22 may have any suitable composition. In particular, the SMA member 22 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable SMAs 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof.

The SMA member 22 can be binary, ternary, or any higher order so long as the SMA member 22 exhibits a shape memory effect, i.e., a change in shape orientation, damping capacity, and the like. The specific SMA member 22 may be selected according to desired operating temperatures of the hot region 18 and the cold region 20, as set forth in more detail below. In one specific example, the SMA member 22 may include nickel and titanium.

As shown in FIG. 1, the energy harvesting system 10 may include a control system 32 that is configured to monitor the first and second temperature of the fluid in the hot region 18 and the cold region 20, respectively. The control system 32 may be operatively connected to any of the components of the energy harvesting system 10.

The control system 32 may be a computer that electronically communicates with one or more controls and/or sensors of the energy harvesting system 10. For example, the control system 32 may communicate with temperature sensors within the hot region 18 and the cold region 20, a speed regulator of the driven component 16, fluid flow sensors, and/or meters configured for monitoring electricity 30 generation of the driven component 16.

Additionally, the control system 32 may be configured to control the harvesting of energy under predetermined conditions of the energy harvesting system 10, e.g., after the energy harvesting system 10 has operated for a sufficient period of time such that a temperature differential between the hot region 18 and the cold region 20 is at a sufficient, or an optimal, differential. Other predetermined conditions of the energy harvesting system 10 may also be used. The control system 32 may also be configured to provide an option to manually override the heat engine 14 and allow the energy harvesting system 10 to effectively be turned off, such as when the thermal energy supplying the hot region 18 is needed elsewhere and should not be converted into other forms of energy by the heat engine 14. A clutch (not shown) may also be controlled by the control system 32 to selectively disengage the heat engine 14 from the driven component 16.

The electricity 30 from the driven component 16 may be communicated to a storage device 36, which may be, without limitation, a battery, battery pack, or another energy storage device. The storage device 36 may be located proximate to, but physically separate from, the energy harvesting system 10.

For any of the examples discussed herein, the energy harvesting system 10 may include a plurality of heat engines 14 and/or a plurality of driven components 16. Likewise, the energy harvesting system 10 may be coupled or operated in conjunction with additional energy harvesting systems 10, where each energy harvesting system 10 includes at least one heat engine 14 and at least one driven component 16. The use of multiple heat engines 14 may take advantage of multiple regions of temperature differentials throughout the energy harvesting system 10.

Referring again to FIG. 2, the first pulley 38 and the second pulley 40 may also include, without limitation: a gear, a one-way clutch, or a spring. A one-way clutch may be configured to allow rotation of the first pulley 38 and the second pulley 40 in only one direction.

The first pulley 38, the second pulley 40, or the idler pulley 42 is operatively connected to the driven component 16 such that rotation—as a result of the dimensional change of the SMA member 22—drives the driven component 16. Furthermore, each of the pulley members may be connected to the driven component 16, or may feed into a transmission or gear system before transferring mechanical energy to the driven member 16. Although three rotational members are shown in FIG. 2, it should be appreciated that more or fewer members may be used.

As described herein, the SMA member 22 may be embedded within a belt or cable. Furthermore, the SMA member 22 may be configured as a longitudinally extending wire that is embedded within the belt such that the belt longitudinally expands and contracts as a function of the associated SMA member 22 as it is expanding and contracting. Additionally, or alternatively, the SMA member 22 may be configured as one or more helical springs that may be embedded within the belt. The SMA member 22 may be a wire that has any desired cross-sectional shape, i.e., round, rectangular, octagonal, ribbon, or any other shape known to those skilled in the art; and the term wire may refer to SMA of any shape. Additionally, the belt may be at least partially formed from a resilient material. For example, the resilient material may be an elastomer, a polymer, combinations thereof, and the like. The belt may be formed as a continuous loop, as shown in FIGS. 2 and 3, or as an elongated strip, which is then joined at its ends to form a loop.

SMA wire can also be flattened into ribbons of arbitrary aspect ratios. Ribbons have better lateral heat transfer characteristics than wire of the same cross-sectional area. When wound around a flat pulley, ribbons have higher friction than straight wire, due to the added contact area. While high aspect-ratio ribbons may have fatigue problems, ribbon with a 3:1 cross-sectional aspect ratio has similar fatigue properties to that of straight wire. However, ribbon having a 3:1 cross-sectional aspect ratio may increases heat transfer by twenty percent. Ribbon-type SMA working members may be, for example and without limitation: straight, wavy or corrugated, with cutouts or holes, or with hanging chads (active or nonactive).

In operation of the heat engine 14 shown in FIG. 2, a localized region of the SMA member 22 may be disposed within, or directly adjacent to, the hot region 18 such that the first temperature causes that corresponding localized region of the SMA member 22 to longitudinally contract as a function of the first temperature of the hot region 18. Similarly, another localized region of the SMA member 22 may be similarly disposed within, or adjacent to, the cold region 20 such that the second temperature causes that localized region of the SMA member 22 to longitudinally expand as a function of the second temperature of the cold region 20.

For example, if the first temperature of the hot region 18 is at or above the hot state, the associated localized region of the SMA member 22 will longitudinally contract as a result of a phase change of the SMA member 22 from the martensite phase to the austenite phase. Similarly, if the second temperature of the cold region 20 is below the cold state, the associated localized region of the SMA member 22 will longitudinally expand as a result of a phase change of the SMA member 22 from the austenite phase to the martensite phase.

The SMA member 22 is continuously looped about the first pulley 38 and the second pulley 40 such that motion imparted from the SMA member 22 causes rotation of each of the first pulley 38 and the second pulley 40 (and also the idler pulley 42). The longitudinal expansion and/or contraction of the localized regions of the SMA member 22 impart motion from the SMA member 22 to the first pulley 38 and the second pulley 40 to move or drive the driven component 16. The localized regions are those portions of the SMA member 22 that are in the respective hot region 18 and the cold region 20 at any given moment.

As shown in the heat engine 14 of FIG. 2, when the SMA member 22 contracts after being heated by the hot region 18, the first timing pulley 39 provides a larger reactive torque than the second timing pulley 41. Therefore, the contraction of the SMA member 22 between the first pulley 38 and the second pulley 40 (which rotate in common with the first timing pulley 39 and the second timing pulley 41, respectively) causes the SMA member 22 to move toward the first pulley 38. As the heat engine 14 enters dynamic operation, the SMA member 22, the first pulley 38, and the second pulley 40 rotate counterclockwise (as viewed in FIG. 2).

The heat engine 14 does not require liquid baths for the hot region 18 and the cold region 20. Therefore, the heat engine 14 does not require significant portions of the SMA member 22 to be submersed in liquids.

In a heat engine dominated by bending, such as a thermobile-type heat engine, output can be increased by constructing an I-beam with SMA elements. In the I-beam, the SMA elements are located at the flanges and a non-active material, such as rubber, is located in the web. Similarly, box beams can be constructed from SMA elements. In box beams, the SMA material is moved away from the neutral axis in the bending dominated heat engine. This increases utilization of the SMA, and thus increases the power output capability of the bending type heat engine.

Referring again to the SMA member 22 of FIG. 2 acting as the SMA working member or working element in the heat engine 14, different techniques or modifications may be used on the SMA member 22 to improve the efficiency of the heat engine 14. The surface or surfaces of the SMA member 22 interacting with, in particular, the first pulley 38 and the second pulley 40 may be treated to increase or decrease traction, and to increase or decrease heat transfer to and from the SMA member 22 to the hot and cold regions 18, 20 or to the pulley members 38, 40.

One treatment of the SMA member 22 is to remove the oxide layer from the SMA member 22 surface. An oxide-free SMA member 22 may result in increased friction between the SMA member 22 and pulleys 38, 40, especially when the pulleys are constructed of steel. Removal of oxides may also increase rates of conductive, convective, and radiative heat transfer to and from the SMA member 22.

Another treatment for the SMA member 22 may involve roughening the surface of the SMA member 22. Roughening may increase traction through increased friction, and has been shown to have no measurable detriment to convective heat transfer.

Coatings may also be added to the SMA member 22. Coatings on the SMA member 22 will increase surface area and may consequently increase heat transfer rates if the coating has a better transfer rate than the SMA and if bonding to the alloy is sufficient. Coatings may also reduce slippage between the SMA member 22 and the pulleys 38, 40. In situations where cooling rates are too high (very low exterior temperatures) coatings could mitigate heat stripping or overcooling.

Additional treatments of the SMA member 22 may include, without limitation: welded features and etching. Welded features, such as teeth or other positive engagement features could be welded to the surface of the SMA member 22 to act as gripping nodes and increased surface area for heat transfer, like fins. Etching features can be created into the surface of the SMA member 22. These etching features would increase the surface area to volume ratio for increased heat transfer and may also assist in positive engagement between the SMA member 22 and the pulleys 38, 40.

A further modification of the surfaces of the first pulley 38 and the second pulley 40 may include placing a thin layer of a piezoelectric element, such as a piezo polymer or an electoactive polymer (EAP) around the pulley in the contact region with the SMA member 22. Either of these piezoelectric coatings may help maintain sufficient traction and reduce slip at the interface.

The piezoelectric coatings will also have the added benefit of generating a voltage/charge each time the piezoelectric coating is loaded during rotation of the first pulley 38 and the second pulley 40 by the SMA member 22. The piezoelectric coatings may be in electrical communication with a collector, such as the storage device 36, to capture the electrical energy generated by the piezoelectric coatings.

Because the circumference of the heat engine 14 drive pulleys may be significantly less than the length of the SMA member 22, this loading will occur at the frequency of rotation of the pulleys, which is typically around 5 times greater than that of the SMA member 22 loop. The loading frequency of the piezoelectric or EAP element coatings may be in the range of 2 to 5 hertz.

This electrical charge is energy that is generated by the piezoelectric coatings at each of the three pulley members in the heat engine 14. The electrical energy could be added to the energy harvested by the heat engine 14 and communicated to the energy storage device 36.

Referring now to FIG. 3, and with continued reference to FIGS. 1 and 2, there is shown another heat engine 54, which may also be incorporated and used with the energy harvesting system 10 shown in FIG. 1. Features and components shown and described in other figures may be incorporated and used with those shown in FIG. 2. The heat engine 54 is disposed in heat-exchange communication with a hot region 68 and a cold region 70. The heat engine 54 includes an SMA member 62 traveling a continuous loop around a first pulley 78, a second pulley 80, and an idler pulley 82.

A first timing pulley 79 and a second timing pulley 81 are mechanically coupled by a timing chain 83. Inclusion of the mechanical coupling provided by the timing chain 83 (in addition to the SMA member 62) between the first pulley 78 and the second pulley 80, means that the heat engine 54 may also be referred to as a synchronized heat engine.

Unlike the heat engine 14 shown in FIG. 2, in the heat engine 54 of FIG. 3, the first timing pulley 79 and the second timing pulley 81 are substantially equal in diameter. In one configuration, the first and second timing pulleys 79, 81 may be the respective axles of the first and second pulleys 78, 80. In the heat engine 54, the second pulley 80 has a larger diameter than the first pulley 78.

As shown in the heat engine 54 of FIG. 3, when the SMA member 62 contracts after being heated by the hot region 68, the second pulley 80 creates a larger moment arm than the first pulley 78. However, the first timing pulley 79 and the second timing pulley 81 provide equal reaction torque. Therefore, the contraction of the SMA member 62 between the first pulley 78 and the second pulley 80 causes the SMA member 62 to again move toward the first pulley 78. As the heat engine 54 enters dynamic operation, the SMA member 62, the first pulley 78, and the second pulley 80 rotate counterclockwise (as viewed in FIG. 3).

Figure 4:
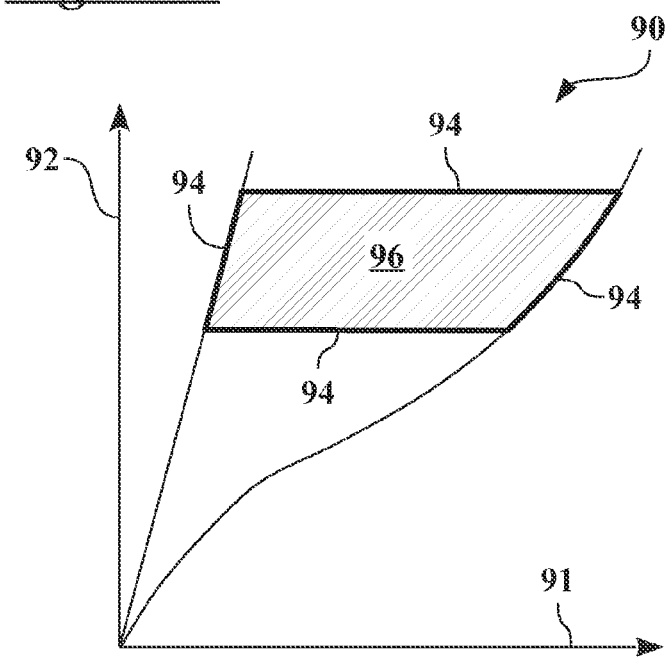
FIG. 4 is a schematic graphical representation of a work diagram for a heat engine, such as those shown in either FIG. 2 or FIG. 3.

Referring now to FIG. 4, and with continued reference to FIGS. 1-3, there is shown a schematic graphical representation of a work diagram 90. An x-axis 91 of the work diagram 90 shows the length of the SMA member 22 shown in FIG. 2, the SMA member 62 shown in FIG. 3, or another SMA working member incorporated into a heat engine, such as the heat engine 14 or the heat engine 54. A y-axis 92 of the work diagram 90 shows the tension force of the SMA member 22 shown in FIG. 2, the SMA member 62 shown in FIG. 3, or another SMA working member.

The work diagram 90 shows a work path 94 following a location or region of the SMA member 22 or the SMA member 62 as it loops during operation of the heat engine 14 or the heat engine 54. Application of a force over a displacement (i.e., a change in length) requires work to be done. A net work zone 96 represents the net work created by the SMA member 22 or the SMA member 62 on each loop. Therefore, the fact that the net work zone 96 is greater than zero shows that the SMA member 22 or the SMA member 62 is producing mechanical work from the thermal energy available to the heat engine 14 or the heat engine 54.

Referring again to FIG. 2, the heat engine 14—and the energy harvesting system 10, as a whole—seeks to capture as much of the available thermal energy as possible and convert that thermal energy into mechanical energy, which may then be used to perform other tasks requiring energy. The heat engine 14 may capture all available heat through various recovery methods to improve the overall efficiency of the energy harvesting system 10.

The heat engine 54 shown in FIG. 3 includes some, or all, of the same goals and alteration, modification, or optimization techniques. Other heat engines may also incorporate the many of the features described herein. However, for simplicity, much of the discussion herein is illustrated with respect to the heat engine 14.

The SMA member 22 is the working element (or driver) for the heat engine 14, and various alternative designs, modifications, and improvements of the SMA member 22 may be used to improve the efficiency of the heat engine 14. Without the dimensional changes provided by the SMA member 22, the heat engine 14 is not able to produce mechanical energy from the thermal energy available. Geometric, material, and manufacturing considerations contribute to the effectiveness of the SMA member 22 in the heat engine 14 or in other heat engines.

The alloy forming the SMA member 22 may be specifically matched to the operating environment (the first and second temperatures) of the hot region 18 and the cold region 20. Furthermore, because the waste heat constituting the hot region 18 may come in fluid form (e.g., geothermal or vehicle radiator), convection (e.g., from a drying oven), conduction (e.g., the surface of a vehicle exhaust pipe), or radiation (e.g., solar), the heat engine 14 and the SMA member 22 may be matched to the specific type of waste heat for which the heat engine 14 is planned.

Matching the alloy to a specific operating environment may reduce or narrow the hysteresis experienced by the SMA member 22 as it loops through the heat engine 14 and continuously contracts and expands under the influence of the hot region 18 and the cold region 20. The temperature hysteresis—or path dependency—of the SMA member 22 may be reduced by adding, for example, copper to alloys of Nickel and Titanium. In embodiments or configurations where the SMA member 22 includes multiple strands or SMA elements (such as multiple springs), different individual alloys may be used to build the SMA member 22, such that the heat engine 14 is built to simultaneously operate over a broad range of operating temperatures.

The SMA member 22 may be formed from thin, straight SMA wire, on the order of, for example, 0.05-0.3 millimeter. Thin-wire may be a relatively inexpensive form of SMA to produce, and produces good operating properties (fatigue, power output). Heat transfer per mass of SMA is relatively high when the SMA member 22 is formed from thin-wire SMA. Increased heat transfer allows the heat engine 14 to cycle material more quickly, especially with a convection heat source as the hot region 18.

The SMA member 22 may be formed as a continuous loop without joints, or as a single loop element having a single joint forming the straight, thin wire into the continuous loop. Alternatively, a single wire may be looped multiple times around the path defined by the pulley members, but still have only one joint. The exact diameter of the thin-wire SMA forming the SMA member 22 may be varied based upon the operating conditions of the heat engine 14, such as, without limitation: the first temperature of the hot region 18 and the second temperature of the cold region 20; the amount of strain introduced in the SMA member 22 during expansion and travel around the loop; the operating frequency of the heat engine 14; and the predicted lifecycle of the SMA member 22 or the heat engine 14.

Forming the SMA working element into a loop may require one or more joints in the SMA member 22. The joint may be created through laser welding the two ends of the SMA working element together.

Welding processes may re-melt the material and create non-uniform grain structure. Post processing of the joints may improve the resulting ultimate tensile strength and cyclic fatigue characteristics of the SMA member 22. Removing the non-uniform grain structure may reduce the likelihood of dislocation collecting and reduce fatigue fractures in the SMA member 22. Post processes of the SMA member 22 may include, but are not limited to: annealing, drawing, rolling, swaging, and varieties of thermo-mechanical processing combinations.

Figure 5A:
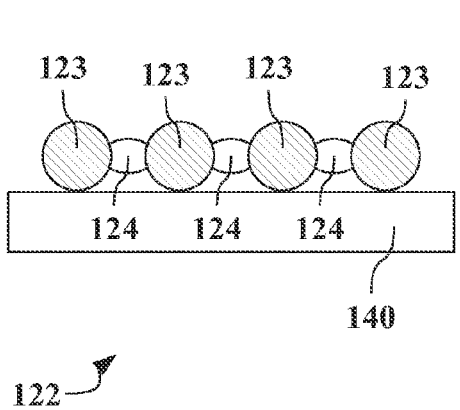
FIG. 5A is a schematic, fragmentary cross-sectional view of a shape memory alloy (SMA) working element form having parallel strands of thin-wire SMA.
Figure 5B:
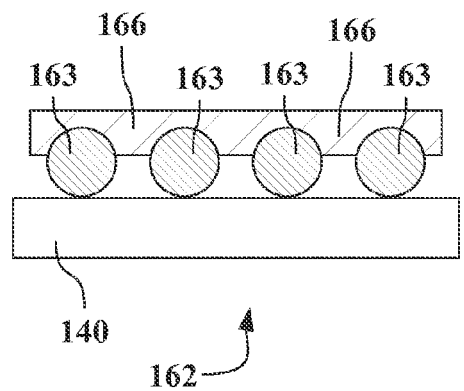
FIG. 5B is a schematic, fragmentary cross-sectional view of another SMA working element form having parallel strands of SMA partially embedded within a matrix.
Figure 5C:
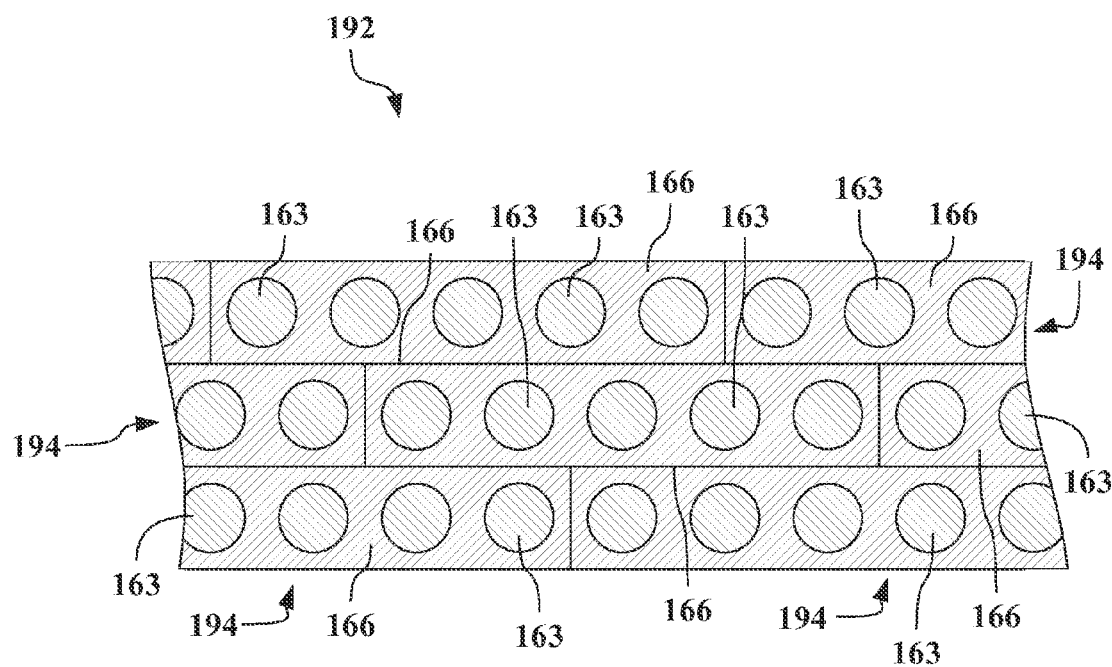
FIG. 5C is a schematic, fragmentary cross-sectional view of a composite SMA working element built from individual units similar to those shown in FIG. 5B.

Referring now to FIG. 5A, FIG. 5B, and FIG. 5C, and with continued reference to FIGS. 1-4, there are shown schematic fragmentary cross-sectional views of additional SMA working element forms. The working elements shown are manufactured or assembled as bands, which have greater width-to-thickness ratios that wires.

FIG. 5A shows an SMA member 122 that is formed from parallel wires, strips or strands 123 of thin-wire SMA. FIG. 5B shows an SMA member 162 that is formed from parallel wires, strips or strands 163 of thin-wire SMA that are partially-embedded within a matrix 166. FIG. 5C shows a composite SMA member 192 that is formed from multiple units of a smaller SMA member.

FIGS. 5A, 5B, and 5C represent additional SMA working element forms that may be used with various types and configurations of heat engines, such as those shown and described herein. Features and components shown and described in other figures may be incorporated and used with those shown in FIGS. 5A, 5B, and 5C.

FIG. 5A shows tack welds 124, which join the parallel strands 123 to form the SMA member 122. Alternatively, the parallel strands 123 may be joined by localized, interlocking deformations which mechanically link the parallel strands 123 without the heating processes involved in welding. Although not shown, the parallel strands 123 may also be free, such that each strand 123 is not joined to the others. A pulley 140 is schematically shown to demonstrate contact between the SMA member 122 and the drive pulleys of the heat engine into which the SMA member 122 is incorporated.

Generally, the cross-sectional shape of the strands 123 shown is round. However, the thin-wire SMA strands 123 may be formed with other cross sections, such as, without limitation: square, rectangular, oval, box-beam, or I-beam. The other shapes of SMA strands 123 may also be formed into bands.

FIG. 5B shows that the SMA member 162 is formed from the SMA strands 163 arranged into a mat or band formation and then into a continuous loop. An outer portion (relative to the pulley 140, which is shown schematically) of the strands 163 is collectively coated or embedded by an elastomer to form the matrix 166.

The matrix 166 keeps the individual strands 163 separate and also conducts heat from the strands 163. However, the matrix 166 does not come directly into contact with the pulley 140, so that the matrix 166 is not compressed between the pulley 140 and the strands 163. Additionally, the partial matrix may better handle the dynamic (size-changing) relationship between the strands 163 and the matrix 166.

The elastomer forming the matrix 166 may be intrinsically thermally conducting or may be filled (or doped) with materials to enhanced heat conduction. These fillers may include metal or carbon/graphite wires, microwires, and nonwires as well as other high aspect-ratio fillers like platelets. The matrix 166 may be placed into direct contact with the heat source to conductively draw heat into the strands 163 in the hot region. Similarly, the matrix 166 may assist in expelling heat to the cold region by conducting heat from the strands 163 and convectively or conductively communicating that heat to the cold region.

The SMA members 122, 162 shown in FIGS. 5A and 5B are illustrated with only four strands 123, 163. However, many more strands 123, 163 may be used in forming the SMA members 122, 162 into wider bands (having greater width-to-thickness ratios).

In large-scale heat engines, the added width, thickness, length, and (possibly) number, of SMA working elements may require multiple idler pulleys to maintain tension and take up slack in the SMA working elements. For example, and without limitation, a bricklayer pattern may be used with multiple units to build up, in a staggered fashion, to a larger and stronger composite SMA working element. While single, thin-wire working elements may be efficient in small-scale operations, it may not be practicable to simply enlarge the single wire for large-scale energy production from the heat engines. Larger, stronger, and more durable SMA working elements may better allow the heat engines into which the SMA working elements are incorporated to produce substantial energy outputs.

Note that while FIG. 5B shows only individual thin-wire SMA strands 163, the matrix 166 may also be used with braids, meshes, or weaves of SMA. With weaves or meshes, for example, the matrix 166 would be applied after assembly of the weave or mesh and would still be located away from the pulley 140. Spring-form SMA strands 163 may also be combined with the matrix 166 to form larger, more-effective working elements.

As shown in FIG. 5C, smaller working element groups or units may be treated as base building units, and additional units may be stacked and layered to form a larger belt, such as the composite SMA member 192, only a portion of which is shown. The composite SMA member 192 is formed from multiple units of an SMA member 194, which has similar elements to the SMA member 162 shown in FIG. 5B.

Five strands 163 are used to form the individual SMA members 194 of FIG. 5C. The individual SMA members 194 also include the matrix 166. However, in this embodiment, the matrix 166 completely covers and surrounds the strands 163. To form the composite SMA member 192, the individual SMA members 194 are stacked and layered in, as an illustrative example, a bricklayer pattern.

In addition to the straight-wire type of SMA working members, other configurations of SMA working members may be used with the heat engine 14 or with other heat engines. For example, and without limitation, SMA working elements may be formed as springs or ribbons, may be braided or weaved together, and may be formed into cables.

Figure 6A:
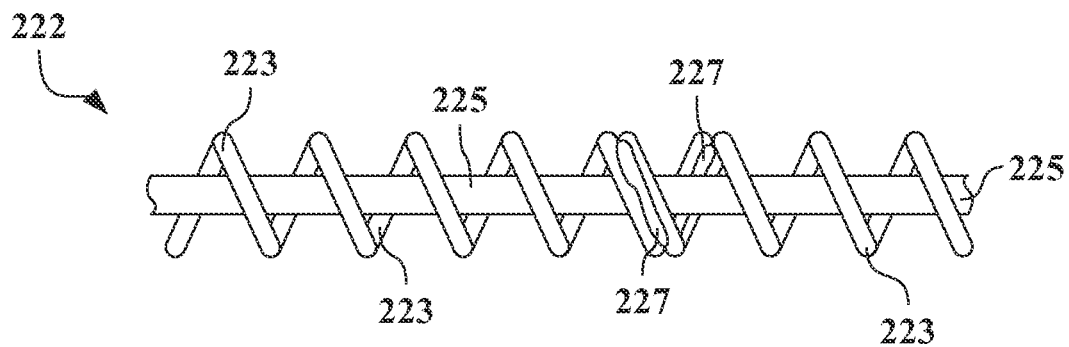
FIG. 6A is a schematic, plan view of a spring-based SMA working element having a fiber core within the spring coil.
Figure 6B:
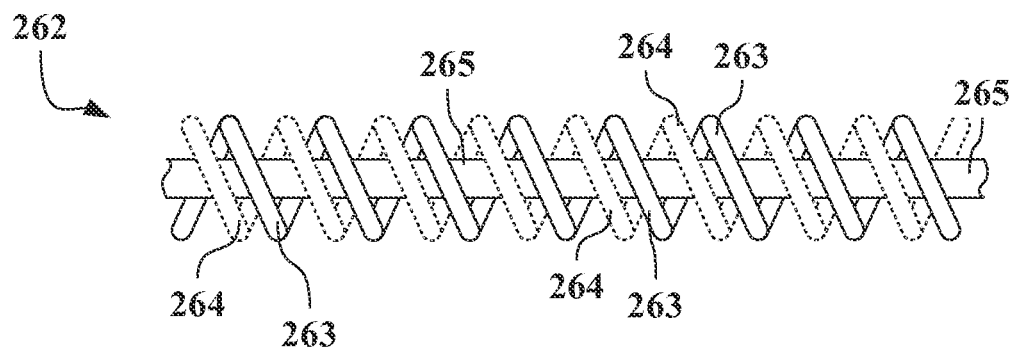
FIG. 6B is a schematic, plan view of another spring-based SMA working element having two springs and a fiber core within the spring coils.
Figure 6C:
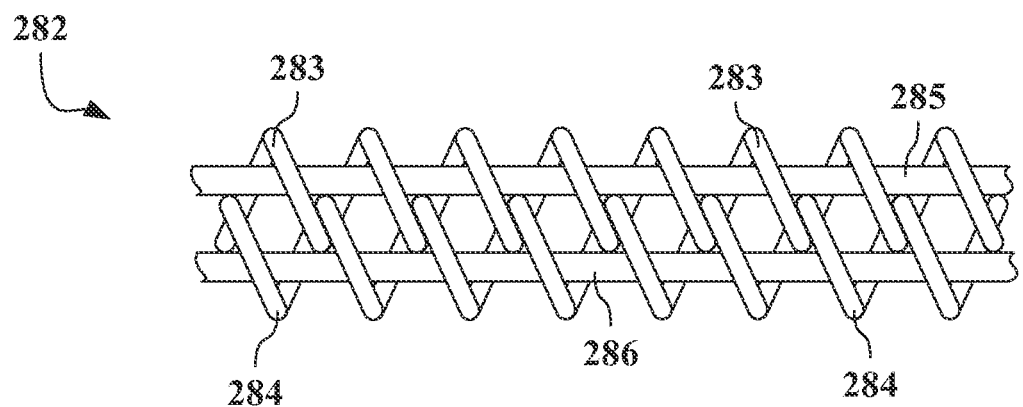
FIG. 6C is a schematic, plan view of another spring-based SMA working element having interleaved springs with two fiber cores within the spring coils.

Referring now to FIG. 6A, FIG. 6B, and FIG. 6C, and with continued reference to FIGS. 1-5C, there are shown portions of additional SMA working element forms, which are spring-based SMA working elements. Features and components shown and described in other figures may be incorporated and used with those shown in FIGS. 6A, 6B, and 6C.

Spring-based heat engines may be capable of running over a large range of operating conditions. The compliance (ability to longitudinally deform through normal spring motion separately from the crystallographic phase changes) of the spring acts as an overload prevention mechanism. Furthermore, the geometry of coiled springs provides relatively high friction around drive pulleys.

FIG. 6A shows a portion of an SMA member 222 that is formed as one or more springs 223 joined into a loop. Note that the portions shown in FIG. 6A may actually be the two ends of a single, looped spring 223.

A fiber core 225 is placed within the coil of the spring 223 and runs throughout the loop created by the SMA member 222. Fibers—including, for example, aramid or para-aramid fibers—are inserted through the coil of the springs 223 to keep the coils in their intended path. Aramid fibers are a group of synthetic fire-resistant and strong polyamides used to make textiles or plastics.

Other elements may be placed within the coil of the SMA springs 223 to support the coil, prevent it from getting slack, and retain the coil during failure. When multiple springs 223 are used, the fiber cores 225 may also prevent some SMA springs 223 from loosening when cooled, which could potentially allow separation of one of the springs 223 from the remainder of the SMA member 222.

A weld region 227 demonstrates one technique for joining the ends of spring-type SMA working members or elements. The weld region 227 utilizes an interlocking portion of the springs 223. For example, the two ends are threaded into each other, and the weld is created along the seam between the two ends. This joining technique creates a more robust joint by placing the weld region 227 in partial compression.

Welding along the seam of the springs 223 also takes advantage of the lap welding method, which can be more robust than a butt weld in this configuration. Additionally, the weld region 227 may be formed such that the weld is only on the inside seam (as opposed to welding both inside and outside, as shown). Welding the seam along the inside circumference of the springs 223 may improve the joint formed at the weld region 227. The interior-only welding method may also better preserve the geometry of the individual springs 223 and the SMA member 222.

FIG. 6B shows a portion of an SMA member 262 that is formed from two springs, a first spring coil 263 and a second spring coil 264, placed and threaded in coaxial alignment with each other, such that each individual loop is working in parallel with the other individual loops. The second spring coil 264 is shown with dashed lines to better illustrate the two separate springs of the SMA member 262. A fiber core 265 is disposed within both the first spring coil 263 and the second spring coil 264. The second spring coil 264 is overlapped in parallel with the first spring coil 263, such that both are generally aligned along the same axis around the same fiber core 265 and will expand and contract in tandem.

Additional spring coil elements may further be arranged in parallel. Note that because the spring-form elements expand, numerous additional coils may be threaded or wound in parallel and the SMA member 262 will still expand or stretch when in operation on an SMA heat engine, such as the heat engine 14 or the heat engine 64.

The first spring coil 263 may be used to form a first loop at a first joint (such as a weld joint) and the second spring coil 264 may be used to form a second loop at a second joint. The first joint may be offset from the second joint such that the joint locations of the each of the loops are not aligned. For example, and without limitation, the joints may be offset by at least ninety degrees relative to the path of the SMA member 262. Note that as the number of spring coils used is increased, the distance (whether linear or rotational) between each of the coils may be reduced. As used in this instance, three hundred and sixty degrees equals one complete loop around the loop of the SMA heat engine into which the SMA member 262 is incorporated.

FIG. 6C shows a portion of an SMA member 282 that is formed from two interleaved springs, a first spring coil 283 and a second spring coil 284. In the SMA member 282, the first spring coil 283 and the second spring coil 284 are aligned or arranged in parallel with their respective axes slightly offset. The first spring coil 283 and the second spring coil 284 are also interleaved, such that portions of the coils of the first spring coil 283 are wound through portions of the coils of the second spring coil 284.

A first fiber core 285 is disposed within the first spring coil 283 and a second fiber core 286 is disposed within the second spring coil 284. The first fiber core 285 and the second fiber core 286 may be ararmid materials. The first spring coil 283 and the second spring coil 284 generally form an SMA belt or ribbon that is wider than it is thick. Additional spring coil elements may further be arranged to widen the ribbon and make the SMA member 282 much wider than shown.

For large SMA heat engines, spring-form SMA can be scaled-up in material density by intertwining multiple springs such that they form a wide mesh ribbon or belt. This may help ensure that failure of a coil would not eject the broken coil into the heat engine or surroundings and may improve the integrity of the SMA member 262.

Further modification of the SMA members 222, 262 may occur through adjustment of the helix angle of the springs 223, 263. Alternatively, the coil diameter may be adjusted and may be matched to the type of pulley used in the heat engine into which the SMA members 222, 262 are incorporated.

Similar to the SMA working elements shown in FIGS. 5A, 5B, and 5C, the spring-based SMA working elements may be combined into belts for use in large-scale energy production. For example, the springs 223, 263 may be tacked together to form flat, planar belts or multiple springs 223, 263 may be aligned, but free, for use with heat engines producing large amounts of energy. Furthermore, pluralities of the springs 223, 263 may be embedded in a matrix material to form a spring-based belt. The matrix may include additives or dopants to improve heat transfer to and from the SMA working element. Multiple belts formed from spring-based SMA materials, similar to the thin-wire based SMA, may also be stacked in multiple, parallel planes.

Figure 7A:
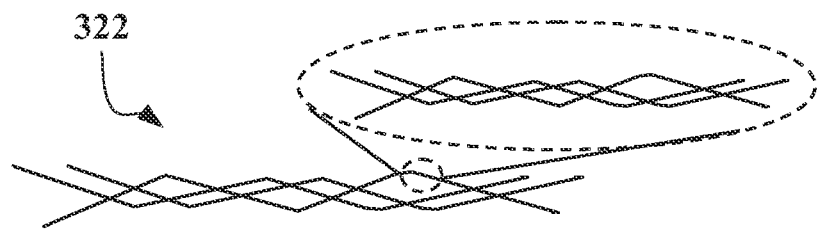
FIG. 7A is a schematic, side view of a braided SMA working element and an inset close-up view of the same.
Figure 7B:
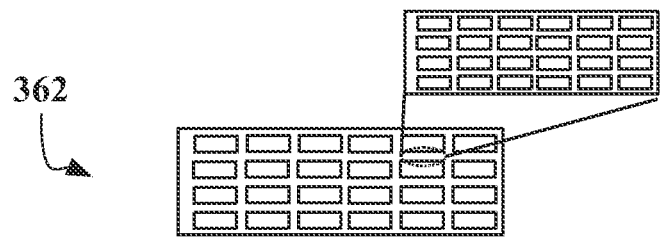
FIG. 7B is a schematic, side view of a woven mesh SMA working element and an inset close-up view of the same.

Referring now to FIG. 7A and FIG. 7B, and with continued reference to FIGS. 1-6B, there are shown portions of additional SMA working element forms, both of which have woven or braided SMA working elements in repeating arrangements. Features and components shown and described in other figures may be incorporated and used with those shown in FIGS. 7A and 7B.

Thin straight wire may be difficult to scale up to the hundreds (or thousands) of wires required to generate hundreds to thousands of Watts of output power from a heat engine. However, thin SMA wires may be woven or braided into configurations that improve the ability to scale up to larger heat engines.

FIG. 7A shows an SMA member 322 formed from thin-wire SMA that has been braided into a longitudinal rope. The SMA member 322 has been configured as a braid of braids, as shown in the close-up portion of FIG. 7A.

FIG. 7B shows an SMA member 362 formed from thin-wire SMA that has been woven into a continuous mat, roughly approximating the cross-section of a flat ribbon. The SMA member 362 has been configured as a mesh of mesh, as shown in the close-up portion of FIG. 7B.

The SMA members 322, 362 shown in FIG. 7A and 7B are generally planer, and may be similar to belts. However, the SMA members 322, 362 may also be formed into three-dimensional shapes, such as by weaving or braiding the SMA members 322, 362 around a three-dimensional core (such as synthetic core fibers or ropes) or around a three-dimensional mandrel.

By varying the braid angle or weave pattern, it is possible to create the SMA members 322, 362 with larger stroke than straight wire SMA working elements. Additionally, a braid or weave can be spliced to form a loop without any welding, which may eliminate metallurgical degradation often associated with SMA welding. Braids or weaves may also have more graceful failure modes because the whole braid or weave tolerates failures of single wires without the entire SMA member 322, 362 losing load-carrying capability. Additionally, the drive pulleys of the heat engine can be manufactured with a relief pattern matching the braid or weave pattern, increasing friction and load-carrying interaction between the drive pulleys and the SMA member 322, 362.

SMA wires may also be wound into cables (wire rope) of variable but significant size, which can be tailored to fit the design of many heat engines. These cables inherit many of the advantages of non-SMA wire rope in terms of high tension capability, very little bending stiffness, load-carrying redundancy, and packaging (spooling).

The cross-sectional construction and lay (handedness) of wires within the strands, and strands within the cable, can be designed to produce various mechanical responses to tailor the nonlinear force-displacement curve, the degree of shakedown (plastic damage that occurs during the early part of the fatigue process), and tension-torsion coupling. Increasing the helix angle, which is the angle between the wire direction and the axis of the cable, tends to increase stroke along the cable axis, at the expense of force. This is one way to mitigate the timing requirements of a straight-wire heat engine, while keeping many of the packing advantages. Additionally, the core of a cable could be made of other non-active materials to keep the SMA material near the outer radius to improve heat transfer response. While cables are nominally round in cross-section, the outer surface is irregular (bumpy) which provides added traction between the drive pulleys and the SMA working member and may also provide secondary heat transfer benefits.

Figure 8A:
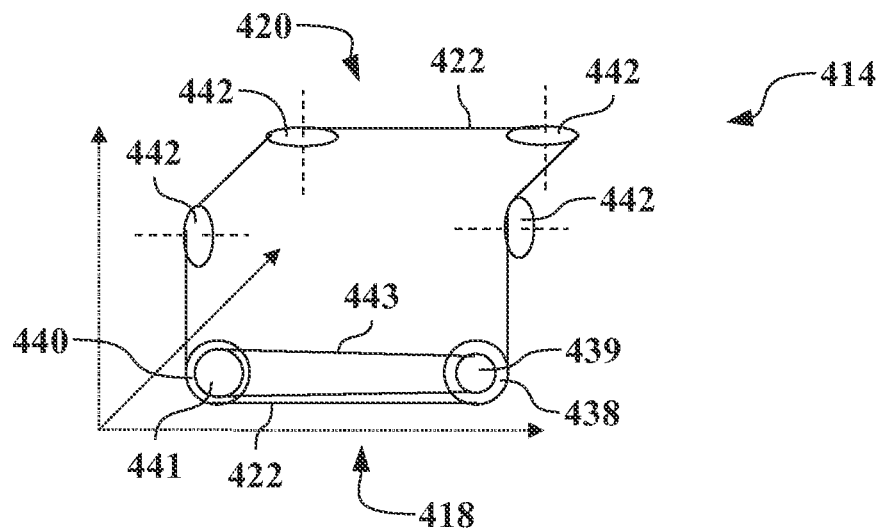
FIG. 8A is a schematic, isometric view of another heat engine having a multi-planar loop.
Figure 8B:
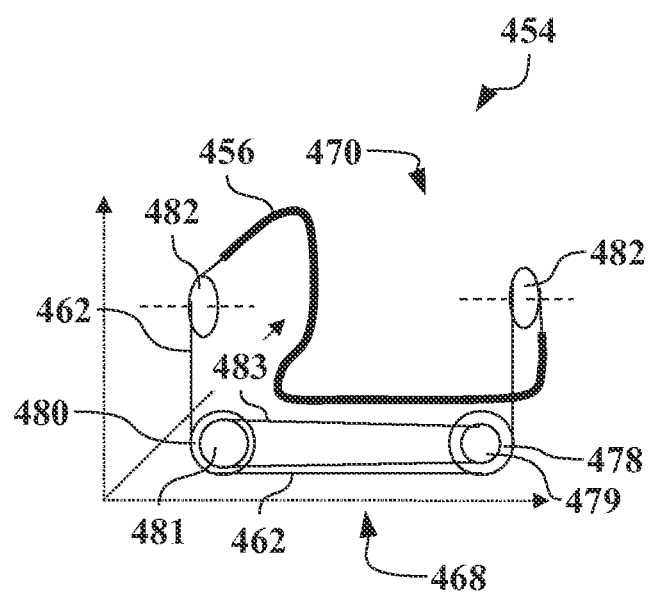
FIG. 8B is a schematic, isometric view of another heat engine having a multi-planar loop with a three-dimensional guide.

Referring now to FIG. 8A and FIG. 8B, and with continued reference to FIGS. 1-7B, there are shown additional configurations of a heat engine 414 and a heat engine 454, both of which may also be incorporated and used with the energy harvesting system 10 shown in FIG. 1 or other heat recovery systems. Features and components shown and described in other figures may be incorporated and used with those shown in FIGS. 8A and 8B.

The heat engine 414 is disposed in heat-exchange communication with a hot region 418 and a cold region 420, and the heat engine 454 is disposed in heat-exchange communication with a hot region 458 and a cold region 460.

The heat engine 414 includes an SMA member 422 traveling a continuous loop around a first pulley 438, a second pulley 440, and multiple idler pulleys 442. A first timing pulley 439 and a second timing pulley 441 are mechanically coupled by a timing chain 443. The heat engine 454 includes an SMA member 462 traveling a continuous loop around a first pulley 478, a second pulley 480, and multiple idler pulleys 482. A first timing pulley 479 and a second timing pulley 481 are mechanically coupled by a timing chain 483.

As shown in FIGS. 8A and 8B, the path of the SMA members 422, 462 is not constrained to one plane. The loop formed by the SMA members 422, 462 is guided by the additional idler pulleys 442, 482. Multi-planar loop paths may assist in packaging the heat engines 414, 454 in constrained space, such as in vehicles. Additionally, the three-dimensional shape of the loops may assist in guiding the SMA members 422, 462 between hot regions 418, 458 and cold regions 420, 460 that are separated or oriented in non-planar relative locations.

The heat engine 454 further includes a three-dimensional guide 456. The three-dimensional guide 456 may be a flexible conduit or pipe, and further expands the relative flexibility of the path through which the SMA member 422 loops. The three-dimensional guide 456 allows the SMA member 422 to avoid obstacles that may otherwise prevent installation or operation of the heat engine 454.

Figure 9:
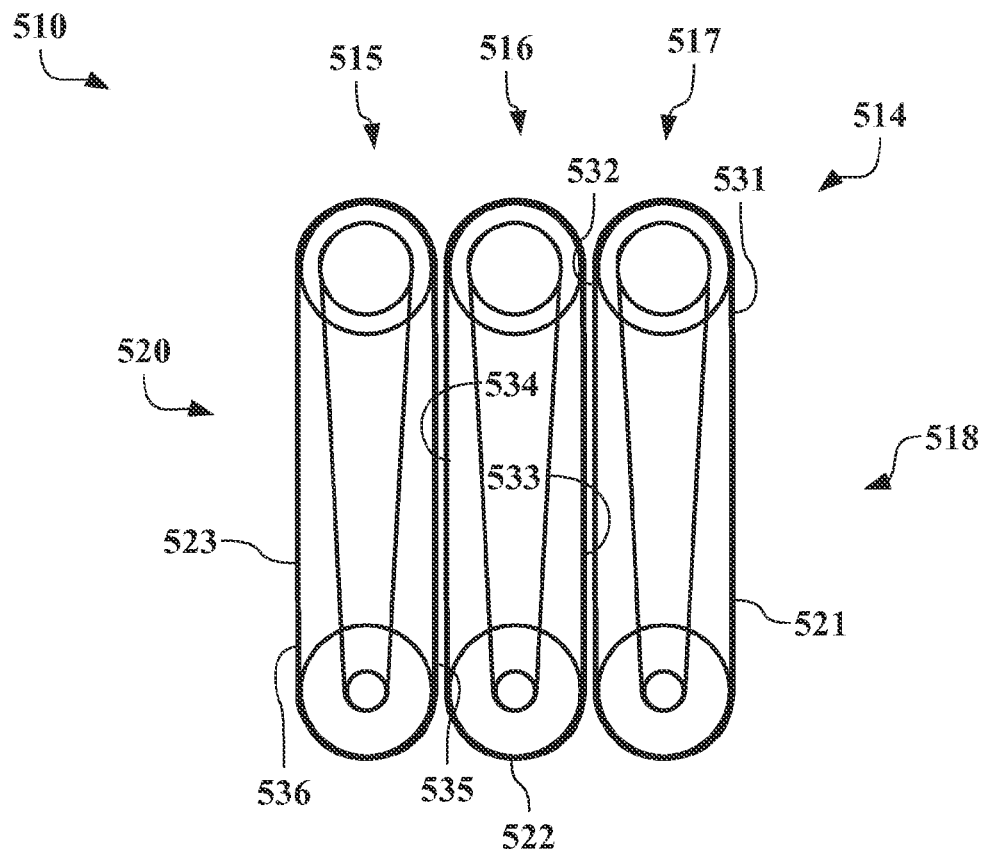
FIG. 9 is a schematic, illustration or diagram of an energy harvesting system having three, cascaded heat engines, in which the cold side of one heat engine acts as the hot side of another.

Referring now to FIG. 9, and with continued reference to FIGS. 1-8B, there is shown a schematic illustration of an energy harvesting system 510 having three heat engines 514, which may be similar to those shown in FIGS. 2 and 3 or may be other heat engines. The three heat engines 514 are arranged in a cascading or chained fashion with the cold side of one engine acting as the hot side of an adjacent engine. Features and components shown and described in other figures may be incorporated and used with those shown in FIG. 9.

An end hot region 518 and an end cold region 520 are disposed adjacent to the energy harvesting system 510. The end hot region 518 may contain, for example, hot fluids moving upward or downward, relative to FIG. 9, or moving perpendicular to the view plane. Similarly, the end cold region 520 may contain fluids moving along the opposing side of the energy harvesting system 510. In this configuration the total temperature difference—and, therefore, the total thermal energy available—is split or divided into several smaller temperature differential windows.

In the configuration shown, the highest temperature engine, denoted as a hot end heat engine 515, would take in the heat directly from the end hot region 518, and then output its cold side into the hot side of the next engine, denoted as an intermediate heat engine 516 in FIG. 9. After conversion to mechanical energy, the remaining thermal energy is expelled from the cold side of the hot end heat engine 515 and is cascaded to the intermediate heat engine 516. Eventually, a cold end heat engine 517 expels heat to the cold region 520.

A first SMA member or hot end SMA member 521 interacts directly with the end hot region 518 on a first hot side 531. The intermediate heat engine 516 includes an intermediate SMA member 522, which is in direct, conductive, heat flow communication with the hot end SMA member 521. Note that designation as first, second, third, or otherwise, is only illustrative and the elements may be numbered in any order without being limiting.

A first cold side 532 of the hot end heat engine 515 communicates with a second hot side 533 of the intermediate heat engine 516 and is in heat flow communication with the intermediate SMA member 522 of the intermediate heat engine 516. The hot end SMA member 521 and the intermediate SMA member 522 are running in opposing directions, which promotes heat transfer therebetween. The intermediate SMA member 522 undergoes its phase change at a lower temperature than the hot end SMA member 521. Therefore, the first cold side 532 acts as the heating source for the intermediate heat engine 516.

The hot end SMA member 521 and the intermediate SMA member 522 can be coated with a medium, such as conductive grease or oil, to increase heat transfer without friction. The hot end SMA member 521 and the intermediate SMA member 522 may be shaped as belts or ribbons. Alternatively, a conductive element may be placed between the hot end SMA member 521 and the intermediate SMA member 522 to help communicate the heat from the hot end heat engine 515 to the intermediate heat engine 516.

Therefore, the cold sink (or cold side) of the hot end heat engine 515 acts as the heat source for the intermediate heat engine 516. Similarly, the cold side of the intermediate heat engine 516 acts as the heat source for the cold end heat engine 517. A third SMA member or cold end SMA member 523 is in communication with, and takes heat from, a second cold side 534 of the intermediate heat engine 516 as its heat source. A third hot side 535 of the cold end SMA member 523 undergoes its phase change at a lower temperature than, and draws heat from the second cold side 534, the intermediate SMA member 522.

As the lowest temperature engine in the configuration shown in FIG. 9, a third cold side 536 of the cold end heat engine 517 eventually interacts directly with the end cold region 520. While each of the heat engines 514 interacts with different temperature hot and cold regions, the temperature differential between the respective hot and cold sides may be similar.

Similar cascading patterns may continue with more than three heat engines 514, such that there may be additional intermediate heat engines taking heat from an adjacent heat engine and expelling heat from another adjacent heat engine. Furthermore, the heat engines 514 may include idler pulleys (similar to the heat engine 14, 54 shown in FIGS. 2 and 3).

In an alternative embodiment, the individual elements could be combinations of SMA heat engines with thermoelectric generators or concentrated solar power systems. Thermoelectric generators may operate with their hot sides at higher temperatures than SMA heat engines, and the SMA heat engines may therefore be used to convert waste heat from the cold side of thermoelectric generators that the thermoelectric generators cannot convert or cannot convert as efficiently.

Alternatively, the heat engines 514 may be arranged progressively along the end hot region 518 to use diminishing thermal energy as the end hot region 518 progressively cools. Such a configuration may be useful for long heat sources like pipes. For example, the hot end heat engine 515 (the highest temperature engine) would take in the heat from hottest area of the end hot region 518 (such as the portion of the pipe receiving the hot fluids). The next engine, the intermediate heat engine 516, would then be located downstream from the hot end heat engine 515 and configured to take advantage of the relatively cooled portion of the end hot region 518 by having an SMA working member configured to convert thermal energy at the reduced temperature relative to the hottest portions of the end hot region 518. Eventually, the lowest temperature engine, the cold end heat engine 517, is configured to interact with the lowest temperature portion of the end hot region 518.

Figure 10:
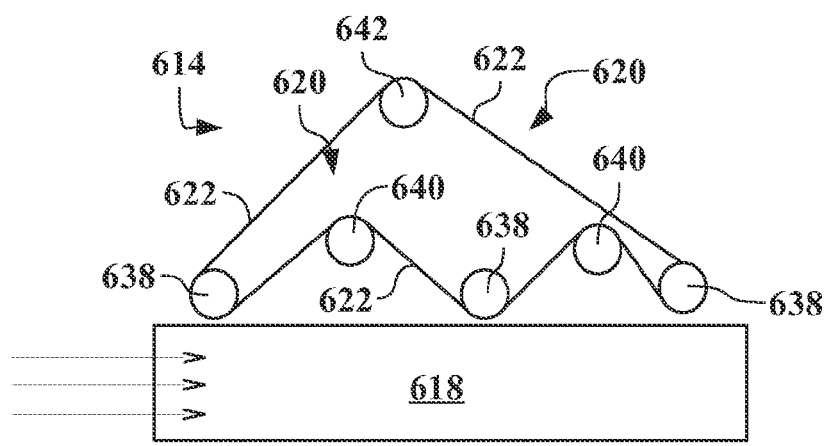
FIG. 10 is a schematic, side view of an energy harvesting system having a longitudinal heat engine.

Referring now to FIG. 10, and with continued reference to FIGS. 1-9, there is shown an energy harvesting system 610 including a longitudinal heat engine 614, which may also be incorporated and used with other energy harvesting systems or heat recovery systems. The heat engine 614 may be beneficial for use with high-aspect-ratio heat sources, such as hot exhaust pipes, conduits, and other sources where the length is significantly greater than the cross section. Features and components shown and described in other figures may be incorporated and used with those shown in FIG. 10.

The heat engine 614 is disposed in heat-exchange communication with a hot region 618 and a cold region 620 (generally upward from the hot region 618, as viewed in FIG. 10). The hot region 618 is a long pipe (only partially shown) carrying hot fluids, such as exhaust gases or heated liquids. For example, and without limitation, the hot region 618 may be the exit pipe from a steam turbine used in electricity generation or may be a pipe carrying oil heated by concentrated solar energy (before or after that oil is used for other purposes). The cold region 620 may simply be the ambient air around the pipe and not affected by the hot region 618, or may be an area of forced airflow, such as from fans or blowers. Therefore, the heat engine 614 may be especially beneficial for converting thermal energy from the hot region 618 by conduction heating and from the cold region 620 by convection cooling.

The heat engine 614 includes an SMA member 622 traveling a continuous loop around a plurality of first pulleys or hot pulleys 638, which are substantially adjacent to the hot region 618; a plurality of second pulleys or cold pulleys 640, which are disposed within, or adjacent to, the cold region 640; and one or more idler pulleys 642. The hot pulleys 638 and the cold pulleys 640 are the driven pulleys and some, or all, may be connected to a driven component (not shown, such as a generator) that is configured to utilize the mechanical energy the heat engine 614 converts from thermal energy of the hot region 618 and the cold region 620.

The longitudinal nature of the heat engine 614, along with the ability to have multiple contractions and expansions of the SMA member 622 allow the heat engine 614 to be used in large applications to produce more significant power output from the energy harvesting system 610. The SMA member 622 may be formed as a large belt of solid SMA wires, SMA springs, or a matrix wire or springs to further enable scale-up of the heat engine 614.

The heat engine 614 may also include timing mechanisms (not shown) to provide mechanical coupling and synchronization between the driven elements. A thermal barrier (not shown) may be used to prevent heat from passing from the hot region 618 to the cold pulleys 640. Alternatively, the distance between the cold pulleys 640 and the hot region 618 may be sufficient to maintain the temperature differential in the SMA member 622 necessary to cause the phase change and produce mechanical energy from the available thermal energy.

Figure 11A:
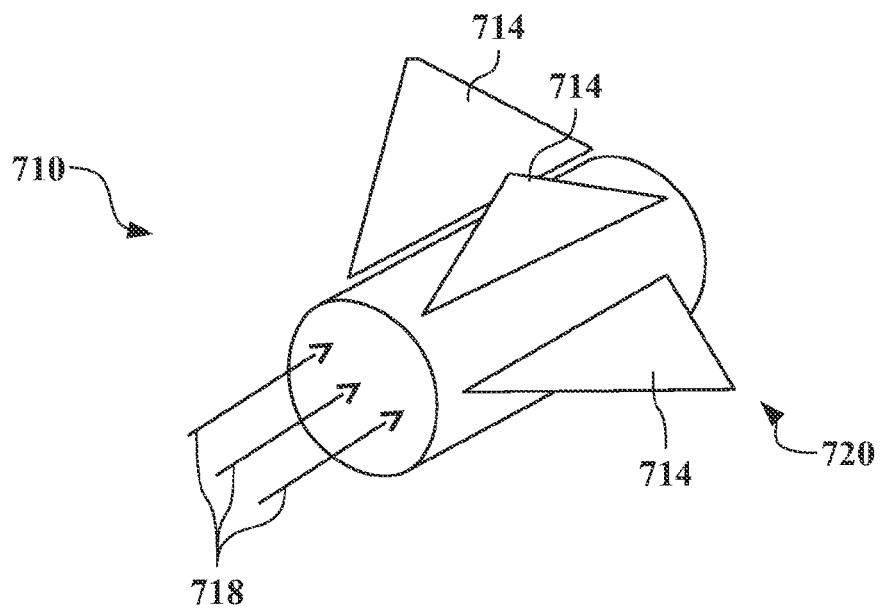
FIG. 11A is a schematic, isometric view of an energy harvesting system having a plurality of heat engines and configured to capture thermal energy from high-aspect-ratio heat sources, such as pipes.
Figure 11B:
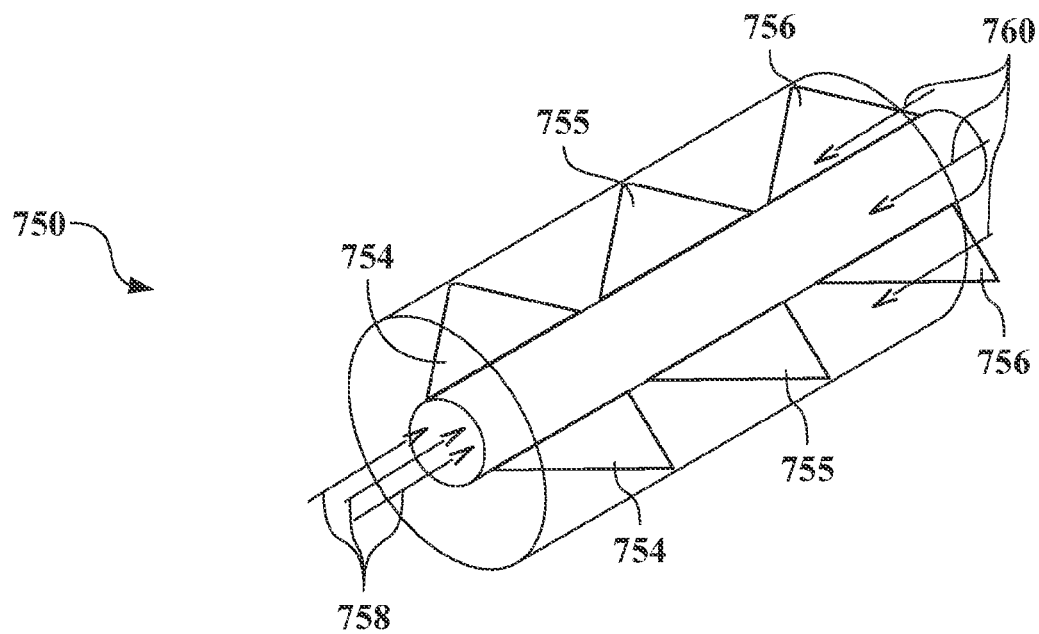
FIG. 11B is a schematic, isometric view of another energy harvesting system having a plurality of heat engines and configured to capture thermal energy from high-aspect-ratio heat sources and counter-flowing cooling sinks.

Referring now to FIG. 11A and FIG. 11B, and with continued reference to FIGS. 1-10, there is shown an energy harvesting system 710 and an energy harvesting system 750. A plurality of heat engines are configured to capture thermal energy from high-aspect-ratio heat sources, such as pipes. Features and components shown and described in other figures may be incorporated and used with those shown in FIGS. 11A and 11B.

As shown in FIG. 11A, a plurality of heat engines 714, which may be similar to the heat engine 14 shown in FIG. 2, the heat engine 614 shown in FIG. 10, or other heat engines capable of longitudinal orientation, are arrayed longitudinally with the length of a hot region 718, which may be a pipe carrying hot fluids. The heat engines 714 extend radially outward from the hot region 718 into a cold region 720, which may be ambient air.

Additional heat engines 714 may be included in the energy harvesting system 710, such that the heat engines 714 substantially surround the entire radius of the hot region 718. The heat engines 714 extract thermal energy from the temperature differential between the hot region 718 and the cold region 720 and convert it to mechanical energy, which is transferred to a driven component (not shown) that utilizes or stores the mechanical energy.

As shown in FIG. 11B, one or more first heat engines 754—which may be similar to the heat engines 14 and 54 shown in FIGS. 2 and 3, or may be other heat engines capable of longitudinal orientation—are arrayed adjacent to a hot region consisting of hot fluids 758. In this configuration, the hot region is a pipe carrying the hot fluids 758, such as the hot working fluids of a power generator.

The first heat engines 754 extend radially outward from the hot fluids 758 into a cold region consisting of cold fluids 760. The cold fluids 760 shown in FIG. 11B are within another pipe or another constrained pathway. In FIG. 11B, the pipe containing the cold fluids 760 substantially encloses the pipe carrying the hot fluids 758. However, the cold fluids 760 need not substantially enclose the heating source and may simply be adjacent. The cold fluids 760 may be supplied as moving ambient air via fans for blowers, or may be cooled fluids, such as from geothermal cooling.

The energy harvesting system 750 also includes one or more second heat engines 755 and one or more third heat engines 756. The second heat engines 755 are placed longitudinally downstream, relative to flow of the hot fluids 758. The third heat engines 756 are placed further downstream.

Additional heat engines may be included in the energy harvesting system 750 to substantially surround the radius of the pipe carrying the hot fluids 758. Therefore the first, second, and third heat engines 754, 755, 756 may be capable of very efficient conversion of thermal energy from the hot fluids 758 by conduction heating and from the cold fluids 760 by convection cooling.

The energy harvesting system 750 is arranged for counter-flow between the hot fluids 758 and the cold fluids 760, such that the hold fluids 758 and the cold fluids 760 flow in opposing directions through the system. This counter-flow arrangement means that the first heat engines 754 are exposed to higher temperatures of the hot fluids 758 than the third heat engine 756. However, the first heat engines 754 are also exposed to relatively warmer temperatures of the cold fluids 760 than the third heat engines 756, which are nearer the inlet of the cold fluids 760.

The pipe carrying the hot fluids 758 may be insulated from the cold fluids 760, such that no direct heat transfer occurs between the hot fluids 758 and the cold fluid 760. Therefore, substantially the only heat transfer occurs between the hot fluids 758 and the first, second, and third heat engines 754, 755, 756 and between the first, second, and third heat engines 754, 755, 756 and the cold fluids 760.

The first, second, and third heat engines 754, 755, 756 interact with the cold fluids 760 at a first cold temperature, a second cold temperature, and a third cold temperature, respectively. Because the cold fluids 760 enter the energy harvesting system 750 near the third heat engine 756, the third cold temperature is the coldest of the three points. However, as the third heat engine 756 expels heat to the cold fluids 760, the temperature of the cold fluid 760 increases. Therefore, the second cold temperature is greater (hotter) than the third cold temperature and the first cold temperature is greater than the second cold temperature.

Therefore, the temperature differential between the adjacent hot fluids 758 and the adjacent cold fluids 760 experienced by the first heat engine 754 may be similar to the temperature differential experienced by the third heat engine 756. That is, the differential between the first hot temperature and the first cold temperature used by the first heat engine 754 is similar to the differential between the second hot temperature and the second cold temperature used by the second heat engine 755.

Each of the first, second, and third heat engines 754, 755, 756 interacts with similar temperature differentials and may therefore have similar power output. This is contrary to direct-flow arrangements (where the hot and cold fluid flow in the same direction), which have a large temperature differential at the entrance (for the first heat engines 754, in this example) to the system and much smaller temperature differentials at the exit (for the third heat engines 756, in this example).

Figure 12:
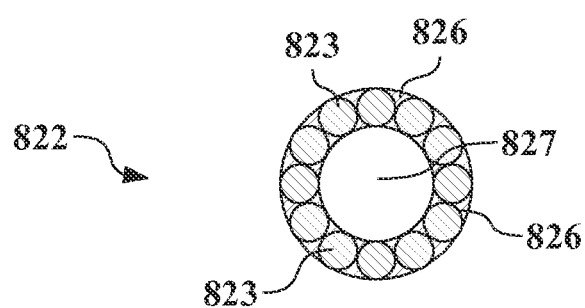
FIG. 12 is a schematic, fragmentary cross-sectional view of a round, three-dimensional SMA working element for use in large-scale heat engines.

Referring now to FIG. 12, and with continued reference to FIGS. 1-11B, there is shown an SMA member 822, which may be used with large-scale heat engines. The SMA member 822 is a round, three-dimensional SMA working element. Features and components shown and described in other figures may be incorporated and used with those shown in FIG. 12.

The SMA member 822 includes a plurality of SMA strands 823, which may be SMA wires, strips, or another other cross section. The SMA strands 823 are braided into a large sheet around a cylindrical mandrel 827. The dry SMA strands 823 may then be infiltrated with a matrix 826 (such as an elastomer) to provide adhesion and robustness.

The elastomer matrix 826 may be intrinsically thermally conducting or may be doped or filled with materials to enhance the conduction and heat transfer with the SMA strands 823. These fillers may include, without limitation, metal or carbon/graphite wires, microwires, and nonwires, as well as other high-aspect-ratio fillers like platelets. The matrix 826 protects the SMA strands 823, provides enhanced thermal transport into and out of the SMA strands 823, and may provide increased friction on associated drive pulleys.

Depending on the configuration of the heat engine, the SMA member 822 can be maintained as a tube for direct implementation or can be slit and then rejoined for application to the heat engine. Furthermore, non-active fibers, such as aramid fibers, may be used as a core for the SMA member 822.

Figure 13:
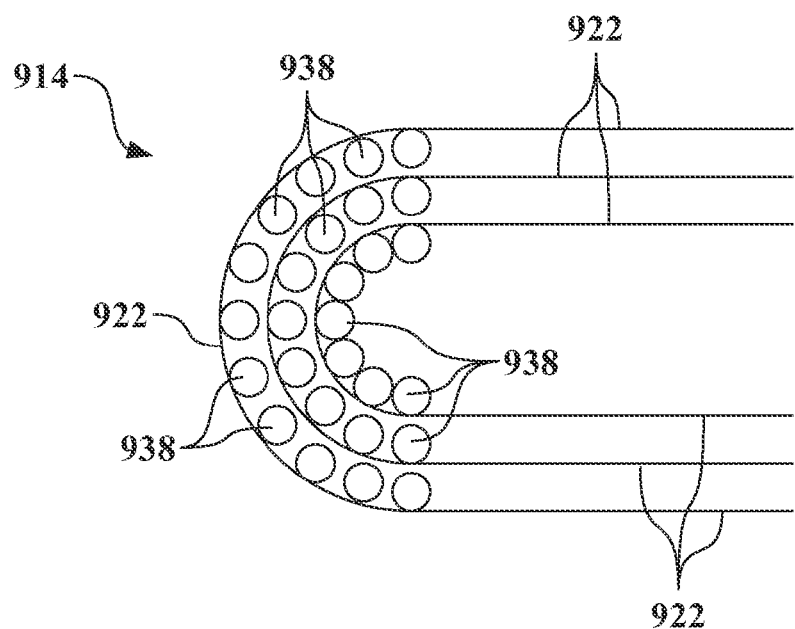
FIG. 13 is a schematic, side view of a portion of a large-scale heat engine having stacked and layered SMA working elements.

Referring now to FIG. 13, and with continued reference to FIGS. 1-12, there is shown a portion of a large-scale heat engine 914, which may be used with large-scale energy harvesting systems. Features and components shown and described in other figures may be incorporated and used with those shown in FIG. 13.

The large-scale heat engine 914 includes a plurality of SMA members 922, which may be, for example and without limitation, SMA belts, SMA braids, or SMA meshes. The plurality of SMA members 922 allow large scale conversion of thermal energy from heat sources and cold sinks (not shown) into mechanical energy in the form of movement of the plurality of SMA members 922.

The mechanical energy from the plurality of SMA members 922 is transferred to a driven component (not shown) such as an electrical generator. The driven component in the large-scale heat engine 914 is in powerflow communication with a plurality of driven pulleys 938.

The plurality of drive pulleys 938 are arranged such that the plurality of SMA members 922 may be stacked and layered relative to each other. The plurality of drive pulleys 938 then transfer mechanical energy to the driven component through a gear box or transmission arrangement, such that the combined power from the plurality of drive pulleys 938 and the plurality of SMA members 922 may be used to generate the output power from the large-scale heat engine 914.

Figure 14:
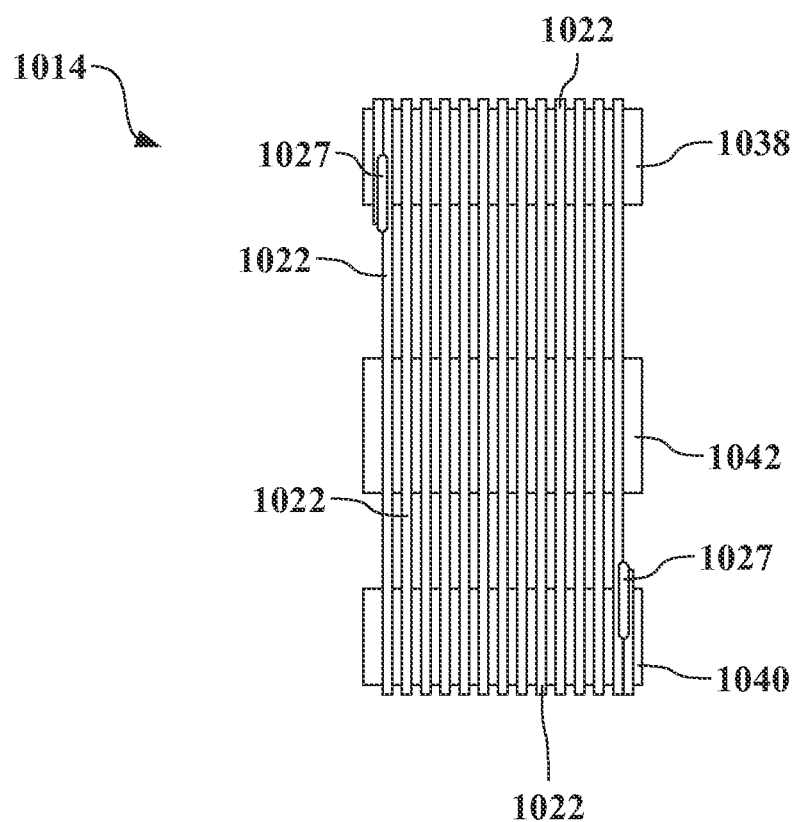
FIG. 14 is a schematic, plan view of a heat engine having a single SMA working element, which forms multiple loops but is welded or joined at only two locations.

Referring now to FIG. 14, and with continued reference to FIGS. 1-13, there is shown a plan view of a heat engine 1014, which may be used with small or large-scale energy harvesting systems. Features and components shown and described in other figures may be incorporated and used with those shown in FIG. 14.

The heat engine 1014 shown in FIG. 14 has a single SMA working element 1022 that forms multiple loops around the heat engine 1014. The SMA working element 1022 circumscribes a first pulley 1038, a second pulley 1040, and an idler pulley 1042. Note that the opposing side of the SMA working element 1022 is not shown. In the configuration shown, the SMA working element 1022 forms approximately thirteen loops.

Even though the SMA working element 1022 loops numerous times, which improves the frictional contact with the first and second pulleys 1038, 1040, the SMA working element is welded only twice, at two joints 1027. Weld points and other joining regions may represent weak spots within loop working elements. Therefore, as opposed to multiple loops that are each formed from individual working elements, the SMA working element 1022 yields the benefits of multiple loops (additional contact area with the pulleys, additional areas of phase change, etc.) but does not greatly increase the number of weak spots in the loops.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A heat engine, comprising:
a first rotatable pulley;
a second rotatable pulley spaced from the first rotatable pulley;
a shape memory alloy (SMA) element disposed about a portion of the first rotatable pulley at a first radial distance and about a portion of the second rotatable pulley at a second radial distance, the first and second radial distances defining an SMA pulley ratio, wherein the SMA element includes:
a first wire;
a second wire parallel to the first wire;
a matrix joining the first wire and the second wire;
wherein the first wire and the second wire are in contact with the first rotatable pulley and the second rotatable pulley; and
wherein the matrix is not in contact with the first rotatable pulley and the second rotatable pulley;
a timing cable disposed about a portion of the first rotatable pulley at a third radial distance and about a portion of the second rotatable pulley at a fourth radial distance, the third and fourth radial distances defining a timing pulley ratio, the timing pulley ratio being different than the SMA pulley ratio;
wherein the SMA element is configured to be placed in thermal communication with a hot region at a first temperature and with a cold region at a second temperature lower than the first temperature; and
wherein the SMA element is configured to selectively change crystallographic phase between martensite and austenite and thereby one of contract and expand in response to exposure to the first temperature and the other of expand and contract in response to exposure to the second temperature, thereby converting a thermal energy gradient between the hot region and the cold region into mechanical energy.

2. The heat engine of claim 1, further comprising:
a third wire parallel to the first wire and the second wire;
a fourth wire parallel to the first wire and the second wire; and
wherein the matrix joins the first wire, the second wire, the third wire, and the fourth wire.

3. The heat engine of claim 2, wherein the matrix is formed from a thermally-conductive material.

4. The heat engine of claim 2, further including a dopant suspended within the matrix, wherein the dopant is formed from a thermally-conductive material.

5. A heat engine, comprising:
a first rotatable pulley;
a second rotatable pulley spaced from the first rotatable pulley;
an idler pulley spaced from the first rotatable pulley and the second rotatable pulley;
a shape memory alloy (SMA) element disposed about a portion of the first rotatable pulley at a first radial distance and about a portion of the second rotatable pulley at a second radial distance, the first and second radial distances defining an SMA pulley ratio, wherein the SMA element includes:
a first end;
a second end;
at least three loops, wherein each of the at least three loops collectively circumscribes the first rotatable pulley, the second rotatable pulley, and the idler pulley;
a first joint joining the first end to one side of the at least three loops;
a second joint joining the second end to an opposing side of the at least three loops;
a timing cable disposed about a portion of the first rotatable pulley at a third radial distance and about a portion of the second rotatable pulley at a fourth radial distance, the third and fourth radial distances defining a timing pulley ratio, the timing pulley ratio being different than the SMA pulley ratio;
wherein the SMA element is configured to rotate continuously about the first pulley and the second pulley and be placed in thermal communication with a hot region at a first temperature and with a cold region at a second temperature lower than the first temperature; and
wherein the SMA element is configured to selectively change crystallographic phase between martensite and austenite and thereby one of contract and expand in response to exposure to the first temperature and the other of expand and contract in response to exposure to the second temperature, thereby converting a thermal energy gradient between the hot region and the cold region into mechanical energy.

6. The heat engine of claim 5, wherein the first joint and the second joint are welds.

7. A heat engine, comprising:
a first rotatable pulley;
a second rotatable pulley spaced from the first rotatable pulley;
a shape memory alloy (SMA) element disposed about a portion of the first rotatable pulley at a first radial distance and about a portion of the second rotatable pulley at a second radial distance and forming a continuous loop, the first and second radial distances defining an SMA pulley ratio, wherein the SMA element includes:
a first wire;
a second wire parallel to the first wire;
a matrix joining the first wire and the second wire, wherein the matrix spans substantially the entire continuous loop of the SMA element and rotates about the first rotatable pulley and the second rotatable pulley;
wherein the first wire and the second wire are in contact with the first rotatable pulley and the second rotatable pulley; and
wherein the matrix is not in contact with the first rotatable pulley and the second rotatable pulley;
a timing cable disposed about a portion of the first rotatable pulley at a third radial distance and about a portion of the second rotatable pulley at a fourth radial distance, the third and fourth radial distances defining a timing pulley ratio, the timing pulley ratio being different than the SMA pulley ratio;
wherein the SMA element is configured to be placed in thermal communication with a hot region at a first temperature and with a cold region at a second temperature lower than the first temperature; and wherein the SMA element is configured to selectively change crystallographic phase between martensite and austenite and thereby one of contract and expand in response to exposure to the first temperature and the other of contract and expand in response to exposure to the second temperature, thereby converting a thermal energy gradient between the hot region and the cold region into mechanical energy continuously rotating the first rotatable pulley and the second rotatable pulley.

* * * * *